Sept. 11, 1928. R. W. DAVENPORT Re. 17,078

HEAT ENGINE

Original Filed Nov. 29, 1922

Rausom W. Davenport
INVENTOR

Reissued Sept. 11, 1928.

Re. 17,078

UNITED STATES PATENT OFFICE.

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY.

HEAT ENGINE.

Original application filed November 29, 1922, Serial No. 603,998. Divided and application filed April 25, 1924, Serial No. 708,936. Original No. 1,619,195, dated March 1, 1927. Application for reissue filed December 31, 1927. Serial No. 244,032.

My invention consists in improvements in heat engines and is particularly adapted to employ in certain thermodynamic operations the novel working substance described and claimed in my copending application filed November 29, 1922, Serial No. 603,998, (Patent No. 1,619,194 issued March 1st, 1927) of which original application the present application is a division; and for performing upon the said novel working fluid such heat-transforming operations as are described and claimed in my application filed June 21, 1922, Serial No. 570,015 also copending.

This present and the two aforesaid inventions constitute a closely related series of inventions.

Besides the above mentioned objects, the present invention provides means for utilizing the peculiar advantages inherent in the aforesaid inventions, and applying them to the practical cooling of refrigerators. Another object is to provide a refrigerating cabinet so arranged and constructed as to afford maximum food storage space with minimum exposure to external heat. Other objects of my invention will appear hereinafter.

All refrigerating apparatus of the compression type hitherto known or used falls into one of two perfectly distinct and separate classes, i. e., the vapor-compression class or compressor-condenser-expander type, and the cold air type or compressor-cooler-expansion motor class. This separation is but the natural result of the essential and basic differences between the liquid-vapor refrigerants used in the former, and the ideal gas refrigerants used in the latter class of apparatus. It is emphasized that in the vapor compression type of heat engine the refrigerating effect is obtained not by expansion but by vaporization of liquid at constant temperature and pressure, which liquid is fed as liquid, and without expansion, through a throttle valve loosely called the "expansion valve", whereas in the cold air machine the entire refrigerating effect is obtained by expanding air or other gas (not vapor) in an expansion motor.

My improved heat engine differs from both the above described types of heat engine in that I employ both an expansion device and a boiler or vaporizing element in novel combination with a compressor and a condenser, and in other respects hereinafter set forth, and is depicted in certain representative forms in the accompanying drawings.

Figure 1:
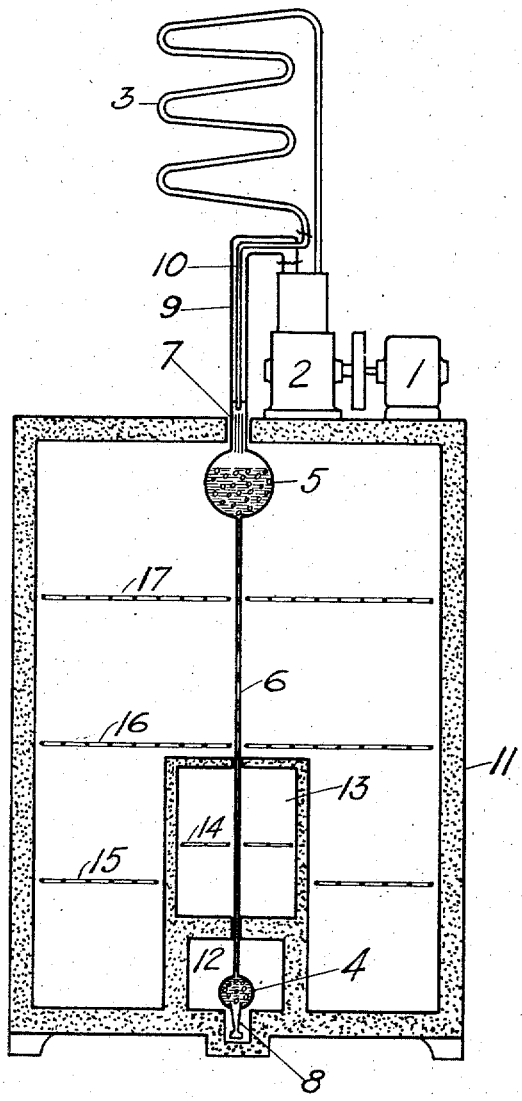
Fig. 1 is a front elevation-section of a form of my invention including the refrigerator.
Figure 2:
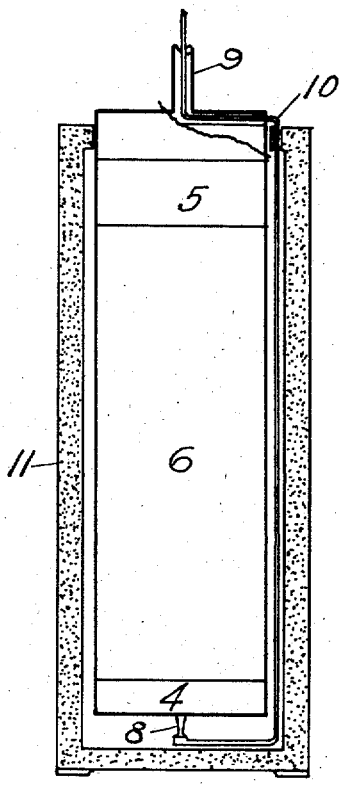
Fig. 2 is a side view of parts of same.

In the form shown in Figs. 1 and 2, in which figures like parts have like numerals, my invention may be described as follows: 1 is an electric motor geared to a compressor 2 which discharges into condenser 3. The evaporator is in general thin and flat and as shown comprises the headers 4 and 5 connected by the ribbon-shaped duct 6, with the separator 7 forming the outlet and nozzle 8 the inlet. The hollow ribbon-shaped portion of the evaporator is made of sheet material, preferably metal, and provides opposed surfaces in close proximity so as to present a maximum external surface area for a minimum quantity of evaporating liquid. The outlet 7 is connected to the intake of the pump 2 by the pipe 9, and the inlet nozzle 8 is connected to the condenser 3 by the pipe 10 which is placed inside the pipe 9 to form a heat exchanger therewith.

The insulated refrigerator cabinet 11 contains compartments 12 and 13 each of which may also be insulated, and the evaporator traverses all three as shown. Shelves 14 to 17 may be used to carry the articles to be cooled.

This embodiment of my invention operates substantially as follows: After charging the system with a proper quantity of suitable working substance of the type before mentioned, with a supply of the liquid component in the evaporator as shown, and air and vapor in the rest of the space, the motor 1 is started and the compressor 2 compels the circulation of the working substance. The total pressure in the evaporator 4—5—6 falls while the total pressure in the condenser 3 rises, thus causing the liquid in the evaporator to evaporate and absorb heat from the refrigerator, and the vapor in the condenser to liquefy and eject heat to any suitable cooling medium as air or water (not shown).

The expander 8 offers suitable resistance to the flow of gas vapor and liquid fed to it in contiguous streams through duct 10 from the condenser, thus maintaining suitable difference in pressure between condenser and evaporator. The liquid in the evaporator is caused to emulsify with the gas and vapor by the action of the expander 8, and this I find to be of great advantage in "facilitating evaporation and rapid cooling" of liquids of relatively low vapor tension, such as alcohol etc., which, in the old vapor compression types of heat engine, lacking my combination of expander and evaporator, lie inert and unable to produce practical refrigerating effect. It is to be understood that the indicated gauge suction or back pressure is higher than that corresponding with the temperature of the liquid refrigerant, which temperature is limited only by the partial vapor pressure effective at a given time and place.

By the combination with the expander, of my improved emulseur-evaporator, I am enabled to derive the further advantage of operating at a plurality of refrigerating temperatures, since I find that the lower header 4 tends to be colder than the upper header 5, when circulation between them is restricted by any suitable means, such as the flattened or ribbon-shaped duct 6. I may apply this peculiar advantage in any desired way as for example, by combining my improved evaporator with suitably insulated chambers 12 and 13 so disposed that the lower one 12 is colder than the others, while chamber 13 is a little higher up and nearer header 5 will be warmer and the main chamber or cabinet itself may be still milder in temperature. By this arrangement water may be frozen in ice-chamber 12, raw meats, milk, butter etc. may be kept at temperatures around that of melting ice in chamber 13, while the main compartments formed by the shelves 15, 16, 17 may be kept at, for instance, 50 degrees F. for general articles such as cooked foods and raw vegetables. Since the bulk of the heat transfer occurs at this relatively high temperature, I am enabled to procure much higher economy than was possible where the refrigerant must be evaporated at a temperature and pressure low enough to make ice, while the cabinet itself was operated at a lower temperature than is really needed, as was necessarily the case with all former refrigerators, cooled by mechanical means.

The evaporator 4, 6, 5 extends from top to bottom and from front to back of the food storage space and presents a heat absorbing surface of substantial extent by reason of the thin and flat portion 6 thereof. The peculiar form of the evaporator and its disposition vertically and centrally of the refrigerator results in a minimum and, in effect, an almost imperceptible loss of food storage space. With such an element the loss of storage space is easily kept down to one-tenth or less. Hence the application of this feature of the invention to any refrigerating cabinet will provide a maximum of available food storage space. For a food compartment of any given size a cabinet with a minimum exposure to exterior heat can be provided by mounting in the compartment an evaporating element in the form of a relatively thin and flat member presenting a large area for heat absorption but occupying a negligible amount of space.

Besides the obvious advantages of my invention, other advantages inhere such as the fact that with the aid of my improved refrigerant before mentioned, my apparatus may be made self-regulating. For example, using carbon tetrachloride as the liquid component of my working substance, the freezing point of which is around zero F., the nozzle 8 freezes up at this temperature thus limiting the temperature in all compartments of the refrigerator and simultaneously unloading the compressor so that the power required is practically as low as that with blanked intake. The costly and troublesome thermostat always a vital part of the former automatic refrigerating machines is, by virtue of the cooperation of my improved refrigerant with the present invention, done away with.

Likewise the trouble-making expansion valve which, in the old systems, was always required in order to maintain the liquid seal essential between the condenser and expander, is, by my invention, dispensed with along with the seal.

The reversibility of the heat engine above described may be extraordinarily high owing to the temperature gradient in the refrigerator.

I claim:

1. Refrigerating apparatus utilizing as a refrigerant a physical mixture of a liquid and a gas inert to and insoluble in said liquid comprising a compressor, means to operate said compressor, a refrigerating element for containing the liquid refrigerant, a continuously open nozzle opening into said element, a condenser, ducts connecting said compressor to said element and to said condenser respectively, and a single duct through which contiguous streams of liquid and gas pass from said condenser to said nozzle.

2. Refrigerating apparatus of the closed cycle type comprising a plurality of refrigerating chambers, vessels containing an evaporable liquid disposed in thermal relation with said chambers, ducts arranged to connect said vessels to form a series, means including a nozzle for expending into the first vessel of said series a stream of mixed gas and vapor, means for removing gas and vapor from the last vessel of the series to provide the stream forced into said first vessel, and means in said cycle for maintaining the aforesaid liquid in said vessels.

3. In a heat engine of the compressor-condenser-evaporator type utilizing as a working substance a liquid and a gas substantially inert and insoluble in the liquid, a compressor, a condenser, and an evaporator, said evaporator for containing a body of said liquid, a De Laval nozzle arranged to discharge into said evaporator, and a single pipe connecting said nozzle with said condenser, said nozzle area being so proportioned as to pass contiguously both the liquid and the gaseous components of the refrigerant.

4. In refrigerating apparatus for utilizing a refrigerant having liquid and gaseous components, an evaporator arranged to contain a body of the liquid component of the refrigerant, means continuously to force the gaseous component of the refrigerant in a closed cycle into and through said body in said evaporator, and means for withdrawing heat from said gaseous component at one point in said cycle.

5. Refrigerating apparatus for utilizing a refrigerant having liquid and gaseous components comprising an evaporator arranged to contain a body of the liquid component of the refrigerant, means continuously to withdraw the gaseous component and the vapor of the refrigerant from the evaporator, cool said mixture and liquefy the refrigerant and return said mixed liquid and gas to the bottom of the evaporator.

6. Refrigerating apparatus for utilizing a refrigerant having liquid and gaseous components comprising a heat absorbing element for containing the liquid component of the refrigerant, a pump withdrawing the gaseous component of the refrigerant from the top of said element, a heat ejecting device through which said gaseous component is forced by said pump, and a duct leading from said device to the base of said element and providing a restricted opening so proportioned as to pass the mingled condensed and non-condensable components of the circulated refrigerant which expand directly into and up through the liquid in said element.

7. Refrigerating apparatus for utilizing a refrigerant having liquid and gaseous components comprising a heat absorbing element for containing the liquid component of the refrigerant, a pump withdrawing the gaseous component of the refrigerant from the top of said element, a heat ejecting device through which said gaseous component is forced by said pump, and a duct leading from said device to the base of said element and terminating in a De Laval nozzle, the nozzle area being so proportioned as to pass continuously and in contiguity both the condensed and non-condensable products of said heat ejecting device.

8. Refrigerating apparatus for utilizing a refrigerant having liquid and gaseous components comprising a heat absorbing element for containing the liquid component of the refrigerant, a pump withdrawing the gaseous component of the refrigerant from the top of said element, a heat ejecting device through which said gaseous component is forced by said pump, a duct leading from said device to the base of said element and providing a restricted opening of such size as to pass the mingled condensed and non-condensable components of the circulated refrigerant directly into the liquid in said element, and means for precooling the circulated refrigerant intermediate said device and said element.

9. Refrigerating apparatus for utilizing a refrigerant having liquid and gaseous components comprising a heat absorbing element for containing the liquid component of the refrigerant, a pump withdrawing the gaseous component of the refrigerant from the top of said element, a heat ejecting device through which said gaseous component is forced by said pump, and a duct leading from said device to the base of said element and providing a restricted opening of such size as to pass the mingled condensed and non-condensable components of the circulated refrigerant directly into the liquid in said element, said duct being brought into thermal contact with the relatively colder gaseous component being withdrawn from the top of said element by said pump thereby to precool the circulated refrigerant.

10. Refrigerating apparatus for utilizing a refrigerant having liquid and gaseous components comprising a heat absorbing element for containing the liquid component of the refrigerant, a pump withdrawing the gaseous component of the refrigerant from the top of said element, a heat ejecting device through which said gaseous component is forced by said pump, and a duct leading from said device to the base of said element and providing a restricted opening of such size as to pass the mingled condensed and non-condensable components of the circulated refrigerant directly into the liquid in said element, a portion of said duct being disposed within the top of said element thereby to precool the circulated refrigerant.

11. In refrigerating apparatus for utilizing as a refrigerant a physical mixture of a liquid and a gas substantially inert to and insoluble in said liquid, a refrigerating element arranged to contain a body of the liquid portion of the refrigerant, and means producing a rapid ebullition of said liquid comprising members forming a closed cycle through which the gaseous portion of the refrigerant is circulated and including a continuously open port in said element through which said gaseous component is forced to bubble up through said liquid component.

12. In refrigerating apparatus for utilizing as a refrigerant a physical mixture of a liquid and a gas substantially inert to and insoluble in said liquid, a refrigerating element arranged to contain a body of the liquid, means producing a rapid ebullition of said liquid body including a compressor arranged to withdraw the gas and the vapor of the liquid from said element and return the same under pressure to said element adjacent the bottom thereof, and means for removing heat from said gas-vapor stream before it is returned to said element.

13. In refrigerating apparatus for utilizing as a refrigerant, a physical mixture of a liquid and a gas substantially inert to and insoluble in said liquid, a refrigerating element arranged to contain a body of the liquid, a compressor arranged to withdraw the gas and the vapor of the liquid from said element, means for removing heat from said gas-vapor stream, and means for returning said gas-vapor stream under pressure to said element comprising a continuously open port in said element.

14. In refrigerating apparatus for utilizing as a refrigerant, a physical mixture of a liquid and a gas substantially inert to and insoluble in said liquid, a refrigerating element for containing a body of the liquid, a compressor arranged to withdraw the gas and the vapor of the liquid from said element, means for condensing at least a part of said vapor, means for precooling said gas-vapor-liquid stream, and means for returning said gas-vapor-liquid stream under pressure to said element comprising a continuously open port in said element.

15. A refrigerator having insulated walls and an elongate refrigerating element vertically disposed therein, and means causing said element to absorb heat from said refrigerator at different temperatures at vertically spaced points thereof.

16. Refrigerating apparatus including a cabinet having insulated walls, an elongated thin flat refrigerating element vertically disposed therein for containing liquid, and means for causing said liquid to evaporate at different temperatures at vertically spaced points thereof.

17. A refrigerator having insulated walls and an elongate refrigerating element vertically disposed therein, and means causing said element to absorb heat from said refrigerator at upwardly spaced points on said element at progressively higher temperatures.

18. A refrigerator having at least three separate heat insulated compartments and a single heat absorbing element in thermal contact with the interior of all said compartments, said compartments and said element being so arranged that heat is removed from said compartment at different temperatures.

19. A refrigerator having heat insulated walls and a heat absorbing element therein vertically disposed and extending substantially from the bottom to the top of the space to be cooled and a series of separately insulated compartments within said space partly enclosing said element and maintained by the latter at progressively higher temperature.

20. A refrigerator having heat insulated walls providing an interior space to be cooled, a compartment in the bottom of said space to be maintained at a temperature below freezing, a compartment above said first named compartment to be maintained at a temperature slightly above freezing, the remainder of the space being arranged to be maintained at a somewhat higher temperature and a single heat absorbing unit having parts in thermal contact with the interior of each of said compartments.

21. A cabinet having a food storage compartment and means for extracting heat from said compartment comprising a thin elongate evaporator element disposed in said compartment and in contact with the atmosphere thereof, said element being formed of sheet material providing opposed surfaces in close proximity.

22. A cabinet having a food storage compartment and means for extracting heat from said compartment comprising a thin elongate evaporator element formed of sheet material providing opposed surfaces in close proximity, the element being so disposed as to take up one-tenth or less of the space within the compartment.

23. A cabinet having a food storage compartment and means for extracting heat from said compartment comprising a hollow ribbon like evaporator element vertically disposed in said compartment and occupying not more than one-tenth of the space therein.

24. A refrigerator cabinet having a food storage compartment and means for extracting heat from said compartment comprising a hollow, flat and ribbon like container for a volatile liquid, said container being vertically disposed in said compartment and occupying one-tenth or less of the space within said compartment.

25. A refrigerator cabinet having a storage compartment inclosed by heat insulating walls, a hollow, flat and ribbon like evaporator element vertically disposed in said compartment for extracting heat therefrom, and means utilizing the heat absorbing properties of the lower portion of said evaporator for the freezing of liquids.

26. A cabinet having a food storage compartment and means for extracting heat from said compartment comprising an element for containing an evaporable liquid, said element presenting opposed surfaces in close proximity and an extended surface area approximating the maximum in relation to its cubical content and disposed in said compartment so as to cause as little lost space as possible.

27. A cabinet having a food storage compartment and means for extracting heat from said compartment comprising an element for containing an evaporable liquid, said element being thin, flat and ribbon like to present an extended surface area approximating the maximum in relation to its cubical content, said element being disposed vertically and substantially centrally of said compartment.

Signed by me at New York, in the county of N. Y., and State of N. Y. this 10th day of December, 1927.

RANSOM W. DAVENPORT.